(12) United States Patent
Pelletier

(10) Patent No.: US 11,132,664 B2
(45) Date of Patent: Sep. 28, 2021

(54) SECURING CONTACTLESS PAYMENT PERFORMED BY A MOBILE DEVICE

(71) Applicant: NAGRAVISION S.A., Cheseaux-sur-Lausanne (CH)

(72) Inventor: Herve Pelletier, Cugy (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 401 days.

(21) Appl. No.: 15/535,932

(22) PCT Filed: Dec. 17, 2015

(86) PCT No.: PCT/EP2015/080121
§ 371 (c)(1),
(2) Date: Jun. 14, 2017

(87) PCT Pub. No.: WO2016/097074
PCT Pub. Date: Jun. 23, 2016

(65) Prior Publication Data
US 2017/0372294 A1    Dec. 28, 2017

(30) Foreign Application Priority Data
Dec. 17, 2014  (EP) .................................... 14198542

(51) Int. Cl.
*G06Q 20/32*    (2012.01)
*G06Q 20/38*    (2012.01)

(52) U.S. Cl.
CPC ..... *G06Q 20/3224* (2013.01); *G06Q 20/3278* (2013.01); *G06Q 20/382* (2013.01)

(58) Field of Classification Search
CPC ............................................ G06Q 20/00–425
See application file for complete search history.

(56) References Cited

U.S. PATENT DOCUMENTS

| 2009/0037725 | A1* | 2/2009 | Farrugia | H04L 9/3234 |
| | | | | 713/155 |
| 2013/0226800 | A1* | 8/2013 | Patel | G06Q 20/3224 |
| | | | | 705/44 |
| 2015/0254665 | A1* | 9/2015 | Bondesen | G06Q 20/3672 |
| | | | | 705/44 |

OTHER PUBLICATIONS

International Search Report issued in PCT/EP2015/080121 dated May 6, 2016.

(Continued)

*Primary Examiner* — John W Hayes
*Assistant Examiner* — Taylor S Rak
(74) *Attorney, Agent, or Firm* — David P. Owen; Hoyng Rokh Monegier B.V.

(57) ABSTRACT

The method, the mobile device, and the payment terminal of the invention relate to security of contactless payment performed during a purchase of products or services by using a short-range wireless communication between the mobile device and the payment terminal. Various external parameters associated to the payment transaction may be exchanged between the mobile device and the payment terminal. Preferred embodiments comprise external parameters such as respective positions of the mobile device and the payment terminal, time stamps related to transaction processing time or identifiers of each the mobile device and the payment terminal. Difference values related to these external parameters are verified by both the mobile device and the payment terminal by carrying out comparison with reference values before validation of the payment transaction by the payment terminal.

10 Claims, 2 Drawing Sheets

(56) References Cited

OTHER PUBLICATIONS

Written Opinion issued in PCT/EP2015/080121 dated May 6, 2016.
Lishoy Francis et al., "Practical NFC Peer-to-Peer Relay Attack using Mobile Phones", International Association for Cryptologic Research, vol. 20100428, vol. 135139, pp. 1-15 (Apr. 23, 2010).
"Payment Tokenisation Specification Technical Framework", Retrieved from the internet: URL: https://www.emvco/com/specifications.aspx?id=263, pp. (Mar. 31, 2014).
Anonymous: "Attaque par relais", Wkipedia, Retrieved form the internet: URL: http://fr.wikipeida.org/wiki/Attaque_par_relais, pp. (Sep. 24, 2014) (with English translation).

* cited by examiner

SECURING CONTACTLESS PAYMENT PERFORMED BY A MOBILE DEVICE

CROSS REFERENCE TO RELATED APPLICATIONS

This application is a U.S. National Stage Application of International Application No. PCT/EP2015/080121 filed Dec. 17, 2015, which claims priority from European Patent Application No. 14198542.4 filed Dec. 17, 2014.

FIELD OF THE INVENTION

The present invention relates to security of contactless payment performed during a purchase of products or services by using a short-range wireless communication between a mobile device and a payment terminal of a merchant.

TECHNICAL BACKGROUND

Contactless payment involves securely exchanging payment information between a payment terminal of a merchant (hereafter, a payment terminal) and customers who use mobile communication devices, such as a smartphone, a tablet computer, or any other mobile personal assistant.

With the development of the information and communication technology, it has become common to use portable devices for performing payment transactions. For example, a smartphone may be used as payment means, in a similar way as with a contactless credit card, thanks to a specific application installed on the smartphone using e.g. RF (Radio Frequency) short-range wireless data exchange with the payment terminal. The mobile device thus comprises at least one appropriate transceiver device able to establish a short-range electromagnetic communication with a payment terminal equipped with a similar transceiver device. Known transceiver devices using communication protocols managing this data exchange comprise mainly NFC (Near Field Communication), Bluetooth or ZigBee technology.

An advantage of the NFC technology is the very short transmission range of a few centimeters, which may limit possibility of eavesdropping or intercepting sensitive data exchanged between the mobile device and the payment terminal.

However, one drawback of the RF short-range wireless communication channels in general is related to their potential security vulnerability. Among the security weaknesses of contactless solutions, the most important one is their vulnerability to "relay attack". In such a case, an unethical player performing cyber attacks, (hereafter attacker, or hacker) may be able to initiate a payment transaction by intercepting data in RF signals exchanged between the mobile device of a customer and a legitimate merchant payment terminal. The intercepted data are then redirected or relayed to another payment terminal for carrying out an illegal payment transaction to the detriment of the customer as well as of the legitimate merchant.

Relay attack principles and some countermeasures are described in following documents:

"Practical NFC Peer-to-Peer Relay Attack using Mobile Phones", Lishoy Francis, Gerhard Hancke, Keith Mayes, and Konstantinos Markantonakis, Information Security Group, Smart Card Centre, Royal Holloway University of London.

This document describes how a relay attack can be implemented against systems using legitimate peer-to-peer NFC communication by developing and installing suitable Mobile Information Device Profile application on the attacker's own NFC-enabled mobile phones. The attack does not need to access secure program memory nor use any code signing, and can use publicly available APIs. Relay attack countermeasures using device location could be used in the mobile environment. These countermeasures could also be applied to prevent relay attacks on contactless applications using 'passive' NFC on mobile phones. The relay attack countermeasure is based on GPS coordinates to check proximity of mobile devices. A mobile device A would basically add its location and a timestamp to the transmitted data. An additional authentication mechanism, such as a digital signature, is then used to verify that the packet was constructed by the mobile device A. A mobile device B compares the location of mobile device A to its own and confirms that the mobile device A is in close proximity. If an attacker relays the data then the location of mobile device A should be in theory further away from the location of the mobile device B and the attack would be detected. The attacker cannot modify the data, or construct a new data packet, as it does not know the key material of the mobile device A. The timestamp prevents an attacker recording a valid transaction and using it at a later stage at the same location. The solidity and/or efficiency of the countermeasure are mainly based on signature encryption strength.

"EMV Payment Tokenization Specification", Technical Framework, v1.0, EMVCo, LLC. is a draft version for a future standard for the Tokenization. This document describes the Payment Tokenization landscape, defines key roles of the entities necessary to support Payment Tokenization, identifies impacts of this specification, specifies the required and optional data fields associated with Token requests, Token issuance and provisioning, transaction processing, and identifies necessary application programming interfaces (APIs). The document is also intended to provide a detailed description of the Payment Tokenization ecosystem, terminology definitions, key responsibilities, and controls specific to each entity within the ecosystem. In addition, this document provides potential use cases, related transaction flows, and the standardization of required and optional fields within these transaction flows across traditional payment functions, such as authorization, capture, clearing, and exception processing. Potential relay attacks during payment transactions as well as solutions to prevent such attacks are not addressed in this document.

SUMMARY OF THE INVENTION

According to one embodiment, it is proposed a method for securing a contactless payment transaction performed by a mobile device on a payment terminal according to claim 1

The method, the mobile device and the payment terminal of the invention are set to operate with various parameters associated with the payment transaction exchanged between the mobile device and the payment terminal. Preferred embodiments described hereafter use a first parameter specific to the mobile device and a second parameter specific to the payment terminal. These parameters may represent respective positions of the mobile device and the payment terminal, time stamps related to transaction processing time or identifiers of each the mobile device and the payment terminal. Difference values related to these parameters are verified by both the mobile device and the payment terminal by carrying out comparison with reference values before validation of the payment transaction.

BRIEF DESCRIPTION OF THE DRAWINGS

The invention will be better understood thanks to the following detailed description, which refers to the attached drawings given as non-limitative examples.

DETAILED DESCRIPTION

Figure 1:
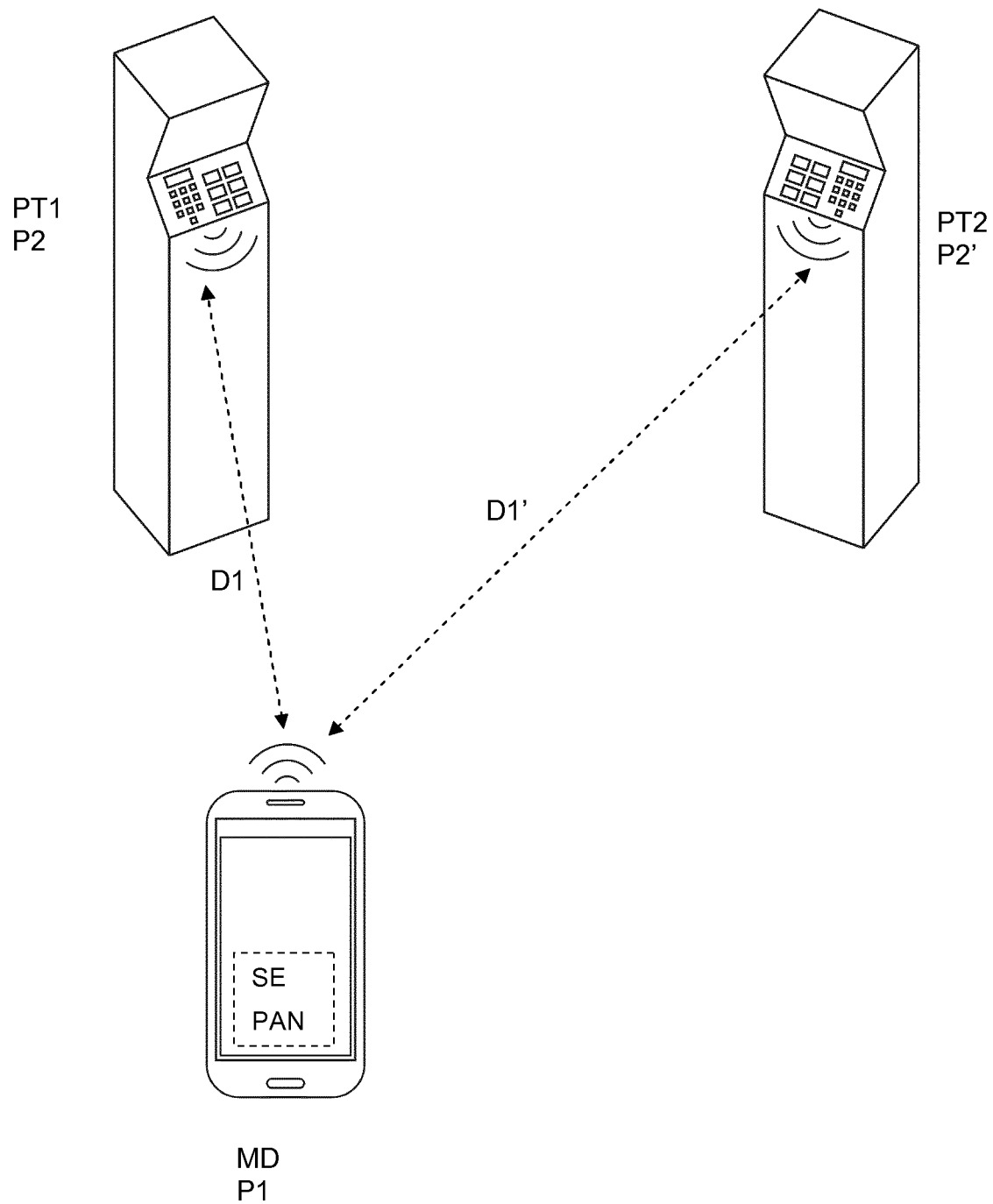
FIG. 1 shows a schematic view representing a mobile device and payment terminals with their respective external parameters corresponding to their respective spatial positions involved in securing contactless payment transactions.

The method of the invention preferably applies in payment solutions for mobile devices using a tokenization protocol based on PCI (Payment Card Industry) data security standard. A primary account number (PAN) is saved in a secure element SE associated to the mobile device.

The mobile device MD may be selected in a group comprising a smartphone, a tablet, a portable computer, or any other portable digital assistant provided with appropriate payment application, secure element and a short-range electromagnetic communication transceiver.

The secure element SE may include a platform onto which applications can be installed, personalized, and managed. It consists of hardware, software, interfaces, and protocols that enable the secure storage of certificates and execution of applications for payment, authentication, and other services. Security-critical applications, such as those involving payment and account certificates, require secure hardware storage and a secure execution environment. On mobile devices, this is usually handled by the secure element.

The secure element SE may be implemented in different forms such as a Universal Integrated Circuit Card (UICC), an embedded secure element, or NFC (Near Field Communication) facilities such as a separate chip or secure device, which can be inserted into a slot on the mobile device or used in a contactless fashion. Typically, a UICC is in the form of a subscriber identity module (SIM), which is controlled by the mobile network operators. An embedded secure element gives service providers the option to embed the secure element into the mobile device itself. A secure element may include one or more security domains, each of which includes a collection of data, such as packages, applets, applications, and the like, that trust a common entity (i.e., are authenticated or managed using a common or global cryptographic key or token). Security domains may be associated with service providers and may include service provider applets or applications such as loyalty, couponing, and credit card, and transit applications, or applets.

At start of a payment transaction between a mobile device MD and a payment terminal PT, the mobile device MD receives from the payment terminal PT, upon a transaction request, transaction parameters TP pertaining to a current payment comprising at least an amount and a transaction identifier. In a preparation phase of the payment transaction, the secure element SE may generate, by using a cryptographic function F, an initial token T0 in form of a cryptogram F(TP) comprising at least the user Primary Account Number (PAN) and the transaction parameters TP associated to a current payment transaction. The initial token T0 may also be generated on-line via the mobile communication network and provided to the secure element SE of the mobile device MD. The cryptogram F(TP) further comprises an integrity figure such as a digest obtained for example by a hash function applied on all or part of the transaction parameters TP.

The initial token T0 is in general unique for a given transaction. Even a same payment terminal PT is used with a same mobile device MD; each payment leads in general to a new token generation by the secure element SE. According to specifications established by the EMVco group (the organization developing and maintaining the Europay, MasterCard, Visa standard) an initial token T0 may also be used for different transactions, in this case an expiry date limits the number of transactions. The payment transaction is validated by the payment terminal PT, which verifies integrity of the initial token T0 before forwarding it to a server of a payment authority PA such as a clearing entity, a bank or a credit card managing center. The server verifies also uniqueness or expiry date of a given token against a "used" tokens database to prevent replaying a same token for another transaction.

When the user authentication on the mobile device MD is carried out successfully, the initial token T0 is ready to be transmitted to a payment terminal of a merchant via a short-range wireless communication channel using as for example NFC or Bluetooth technology.

The user authentication may be performed by introducing a PIN code or a fingerprint in an appropriate user interface of the mobile device operating system or of a payment application.

According to the invention, a first parameter P1 specific to the mobile device MD and a second parameter P2 specific to the payment terminal PT are verified by the mobile device MD and the payment terminal PT before forwarding the initial token T0 to the payment authority PA.

According to a preferred embodiment illustrated by FIG. 1, the first parameter P1 and the second parameter P2 represent spatial positions defined by coordinates (X, Y, Z) of each the mobile device MD and the payment terminal PT. These coordinates may be determined by a location application installed in the mobile device MD using a GPS (Global Positioning System) system. Concerning the payment terminal PT having in general a fixed location, the position may be stored in a memory during installation.

In case of indoors locations where the signals provided by GPS system are too weak to be received by the mobile device MD, indoor positioning systems IPS may be used to determine positions. Instead of using satellites, IPS solutions may use different technologies, including distance measurement based on RF emitters used as position references such as WiFi access points, or on positioning systems using magnetic, acoustic, or optical technologies.

These positions coordinates are exchanged via the short-range wireless communication channel and verified by the mobile device MD as well as the payment terminal PT before processing the payment transaction. The verification is based on a comparison of a distance D determined by the current positions (P1, P2) and a pre-stored reference distance range Dref.

Figure 2:
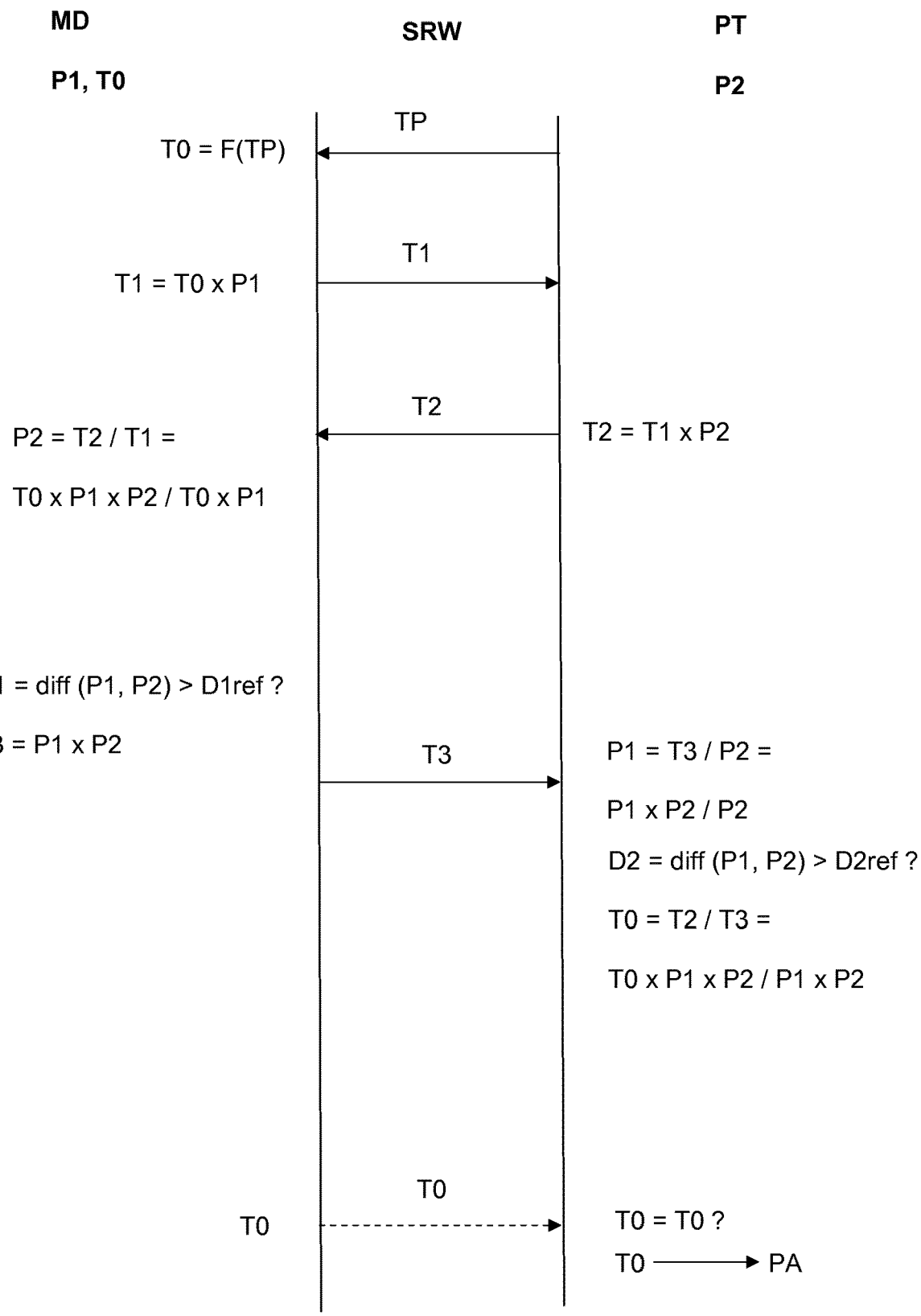
FIG. 2 shows a flowchart of data exchanged between a mobile device and a payment terminal via a short-range wireless communication channel according to the invention.

The flowchart of FIG. 2 shows the data exchanged, via a short range wireless channel SRW, between a mobile device MD and a payment terminal PT formed by the initial token T0 combined with parameters (P1, P2) specific respectively to the mobile device MD and the payment terminal PT.

In an initial step, the payment terminal PT transmits to the mobile device MD, transaction parameters TP pertaining to a current payment transaction to be performed by the mobile device MD. The transaction parameters TP comprise at least a primary account number (PAN) related to the user of the mobile device (MD), and an amount corresponding to the current payment transaction. According to an option, the transaction parameters TP may be completed by one or more parameters such as for example an identifier of the transaction, the terminal, or the merchant.

The initial token T0 generated by the secure element SE of the mobile device MD forms a cryptogram F(TP) unique for the current transaction. The position coordinates P1 provided by the GPS or IPS application of the mobile device MD are then combined with the initial token T0 by applying a reversible mathematical operation noted (x) such as an addition, multiplication, XOR (exclusive OR), or any other reversible combination thereof. The result thus obtained consists of a first token T1=T0×P1, which is transmitted to the payment terminal PT via the short-range wireless communication channel SRW.

The payment terminal PT replies by sending to the mobile device MD a second token T2=T1×P2 resulting from a combination of the first token T1 and the position P2 of the payment terminal PT by applying the reversible mathematical operation. The mobile device MD determines the position P2 of the payment terminal PT by applying the inverse of the reversible mathematical operation noted (/) to the first token T1 and second token T2.

In fact, P2=T2/T1 where T2=T1×P2 and T1=T0×P1 giving T0×P1×P2/T0×P1=P2.

By knowing the positions P1 and P2, the mobile device MD calculates a mobile difference value D1 corresponding to a distance D1 between the mobile device MD and the payment terminal PT. This distance D1 is then compared with a reference distance range D1ref stored in a memory of the mobile device MD.

The comparison fails when the current distance D1 is out of the reference distance range D1ref, i.e. a distance longer than the reference distance D1ref, the transaction is stopped. In fact, in case of a relay attack, a distance D1' between the mobile device MD and an exploited, fake, or any other payment terminal PT2 at a different position P2' is superior to the reference distance D1ref.

If the comparison is successful, i.e. the distance D1 is comprised within the reference distance range D1ref, a third token T3=P1×P2 is transmitted by the mobile device MD to the payment terminal PT. This token T3 results by applying the reversible mathematical operation (x) to the position P1 of the mobile device MD and to the position P2 of the payment terminal PT.

The payment terminal PT having received the third token T3 determines the position P1=T3/P2=P1×P2/P2 of the mobile device MD by combining the third token T3 and the position P2 of the payment terminal PT with the inverse of the reversible mathematical operation (/).

In a similar way than the mobile device MD at previous step, the payment terminal PT, also knowing the positions P1 and P2 calculates a terminal difference value D2 corresponding to a distance D2 between the mobile device MD and the payment terminal PT. This distance D2 is then also compared with a reference distance range D2ref stored in a memory of the payment terminal PT.

If the current distance D2 exceeds the reference distance range D2ref, the transaction is stopped. In contrary case, when the distance D2 is comprised within the reference distance range D2ref, the payment terminal PT determines the initial token T0 by combining the second token T2 and the third token T3 previously received with the inverse of the reversible mathematical operation.

In fact: $T0=T2/T3=T1 \times P2/P1 \times P2=T0 \times P1 \times P2/P1 \times P2=T0$ The initial token T0, thus obtained is processed by the payment terminal PT that forwards it to a bank, or a credit card managing center for clearing.

According to an option, the mobile device MD may send the initial token T0 to the payment terminal PT for checking identity with the initial token T0 calculated by T0=T2/T3 before sending it to the payment authority PA. A difference between the token T0 sent by the mobile device MD and the token T0 calculated by the payment terminal PT may result from a modification of either position P1 or position P2 or both used to calculate the initial token T0. A token T0' different from the initial token T0 generated by the mobile device MD will be rejected by the payment terminal PT in presence of the token check option or by the payment authority PA in absence of this option.

Passive relay attacks where a hacker attempts to transfer a captured transaction to another terminal without modifying data are prevented through the tests performed by both the mobile device MD and the payment terminal PT, which compare distances (D1, D2) with reference distance ranges (D1ref, D2ref) according to the preferred embodiment.

The method of the invention also allows preventing active relay attacks, i.e. where a hacker captures and modifies data transmitted between a mobile device MD and a payment terminal PT for using the modified data to carry out transaction with another payment terminal.

For example, during an active relay attack, a mobile device MD' of a hacker may capture the tokens T1=T0×P1 and T2=T1×P2 exchanged between an original mobile device MD and a first payment terminal PT1. The mobile device MD' of the hacker calculates the position P2=T2/T1 of the first payment terminal PT1 and modifies the obtained position P2 so that the modified value P2' passes the distance test performed by the mobile device MD'.

The mobile device MD' transmits then a token T3'=P1'×P2' resulting from a combination of the position P1' of the mobile device MD' and the modified position P2' to a second payment terminal PT2 at position P2' which performs the distance test successfully because the value of the position P2' is comprised within the reference distance range D2ref. The second payment terminal PT2 thus calculates an initial token T0'=T2'/T3'. This initial token T0' will not correspond to the original initial token T0 generated by the original mobile device MD. In fact, the token T3'=P1'×P2' is calculated with the position P1' of the mobile device MD' of the hacker instead with the position P1 of the original mobile device MD, which cannot be calculated from the token T1 without knowing the initial token T0 generated by the original mobile device MD. Furthermore, the token T2'=T0× P1×P2' includes the position P1 of the original mobile device MD instead the position P1' of the mobile device MD' of the hacker.

Finally, even a modified payment terminal position P2' passes the distance tests performed on the mobile device MD' and the payment terminal PT2, the obtained initial token T0' is rejected by the payment terminal PT2 which may analyze it by performing integrity tests for example. If the payment terminal PT2 forwards the obtained token T0' directly to the payment authority PA server without preliminary verification, the token T0' will also be rejected after verification by this server.

A particular aspect of the method of the invention is that the parameters P1, P2 are masked by the initial token T0 from the start of the transaction until the end when the token T0 is revealed at the payment terminal by applying the inverse of the mathematical reversible operation on the second token T2 and the third token T3. Thanks to this masking effect, both the parameters P1 and P2 cannot be obtained in an easy way for successfully performing an active relay attack with a correct initial token T0 transferred from one payment terminal to another.

According to a further embodiment, the parameters P1, P2 comprise a time stamp formed by the current date and time indicated by the mobile device MD and the payment terminal PT at start of a payment transaction. This embodiment may be used in cases where the respective positions of the mobile device MD and the payment terminal PT cannot be determined either in absence of a GPS/IPS application on the mobile device MD or lack of a stable positioning signal as for example in underground places or inside buildings. However, for comparing time stamps, time synchronization between the payment terminal PT and the mobile device MD becomes necessary. Such synchronization may be provided through the mobile communication network for the mobile device MD and by the same mobile network or a wired local network for the payment terminal PT.

The respective time stamps are exchanged and verified by the mobile device MD as well as the payment terminal PT before validating the payment transaction in a similar way than the respective positions of preceding embodiment. The verification is based on a comparison, with a pre-stored reference period of typically a few seconds, of a time difference determined between a current time stamp and a time stamp provided by the payment terminal PT. The time stamp of the payment terminal PT is sent to the mobile device MD with the second token T2 in response to reception of the first token T1.

When the time difference calculated by the mobile device MD, respectively the payment terminal PT exceeds the reference period, the transaction is stopped. In fact, in case of an active relay attack, the time taken by the mobile device MD for simulating a real transaction by data modifications is longer than the time taken by a normal transaction processing between the mobile device MD and the payment terminal PT.

When the time difference is comprised within the reference period, the transaction is considered as valid by the payment terminal PT and the initial token T0 is forwarded to a server of a payment authority PA.

According to a further embodiment, the parameters comprise an identifier ID2 of the payment terminal PT and an identifier ID2' acquired by the mobile device MD. At the beginning of a payment transaction, the mobile device MD first acquires an identifier ID2' of the payment terminal PT via another channel than the short-range wireless communication channel SRW. The identifier ID2' may be located on or closed to the payment terminal PT.

For example, the identifier of the payment terminal ID2' may be displayed in form of a bar code or a QR code readable by a camera of the mobile device MD using an appropriate application. The mobile device MD then transmits to the payment terminal PT the first token T1 including the initial token T0 combined with the read identifier ID2'.

The payment terminal PT replies by transmitting the second token T2 including the first token T1 combined with an identifier ID2 retrieved from a memory of said payment terminal PT. The verification is thus based on a result of conformity check of the identifier ID2' acquired by the camera and the identifier ID2 received with the second token T2. In case of a difference between these identifiers ID2' and ID2 showing a probable attempt of a relay attack, the transaction is stopped. In the contrary case, the mobile device MD transmits the third token T3 formed by the combination of the identifiers ID2 and ID2' for conformity verification by the payment terminal PT, which compares the identifier ID2' acquired by the mobile device MD with its stored identifier ID2.

When the identifiers conformity check is successful on the mobile device MD and the payment terminal PT, the transaction is considered as valid by the payment terminal PT and the initial token T0 is forwarded to a server of a payment authority. PA.

According to an option, the tokens T1, T2 and T3 transmitted via the short-range wireless communication channel SRW may be signed with a cryptographic key K negotiated between the mobile device and the payment terminal at start of the payment transaction. An algorithm such as Diffie-Hellman may be used for exchanging data necessary to determine the cryptographic key K on both the mobile device and the payment terminal without exchanging the key K itself.

The signature comprises a digest of the transmitted token (T1, T2, T3) encrypted with the cryptographic key, the digest being calculated by applying a one-way and collision free hash function of type SHA-2, SHA-3, BLAKE or of any other proprietary type on the concerned token.

At reception of a token (T1, T2, T3) by the mobile device MD or the payment terminal PT, the signature is verified by decrypting the received digest and comparing this decrypted digest with a digest calculated by applying the hash function on the received token (T1, T2, T3). If the calculated digest is identical to the received digest, the token is accepted, otherwise it is rejected, and the processing of the transaction stopped. The cryptographic key may be of symmetrical or asymmetrical type.

Given that the short-range wireless communication channel SRW is considered as unsecure, the key negotiation may be visible by an attacker, in particular during a "man in the middle attack", whose mobile device takes the place of the "original" mobile device and becomes able to determine the cryptographic key K. The exchange of tokens combined with parameters and verification processes according to the invention thus represents an efficient and sufficient solution to the relay or man in the middle attack problem, which cannot be solved in by a suitable cryptographic solution in an environment implementing an unsecure wireless communication channel.

The invention claimed is:

1. A method for securing a contactless payment transaction between a payment terminal and a mobile device, wherein the payment terminal and the mobile device communicate using a data communication protocol, the method comprising:
receiving from the payment terminal, by the mobile device, data including transaction parameters pertaining to a payment transaction;
generating, by the mobile device, an initial token from at least part of the received transaction parameters;
providing, by the mobile device, data including the initial token;
generating, by the mobile device, a first token from the initial token and a first parameter for the mobile device by applying a reversible mathematical operation in the mobile device;

transmitting, by the mobile device, to the payment terminal, via a short range wireless communication channel, data including the first token;

generating, by the payment terminal, a second token from the first token and a second parameter for the payment terminal by applying the reversible mathematical operation in the payment terminal;

receiving, by the mobile device, from the payment terminal, data including the second token;

determining, by the mobile device, the second parameter from the second token and the first token by applying an inverse of the reversible mathematical operation;

determining, by the mobile device, a mobile difference value between the first parameter and the second parameter;

comparing, by the mobile device, the mobile difference value with a reference difference range stored in a memory of the mobile device and determining whether the mobile difference value is within the reference difference range;

generating, by the mobile device, a third token from the first parameter and the second parameter by applying the reversible mathematical operation in the mobile terminal;

transmitting, by the mobile device, to the payment terminal data including the third token;

determining, by the payment terminal, the first parameter from the third token and the second parameter by applying the inverse of the reversible mathematical operation;

determining, by the payment terminal, a terminal difference value between the first and the second parameter;

comparing, by the payment terminal, the terminal difference value with a predetermined reference difference range stored in a memory of the payment terminal;

determining, by the payment terminal, the initial token from the second token and the third token by applying the inverse of the reversible mathematical operation; and transmitting, by the payment terminal, data including the determined initial token to a server of a payment authority, and processing the current payment transaction by the payment terminal.

2. The method according to claim 1, wherein the first parameter and the second parameter represent position coordinates of the mobile device and the payment terminal, respectively, the position coordinates represent a global positioning system (GPS) or an indoor positioning system (IPS).

3. The method according to claim 2, wherein the difference value determined by the mobile device or the payment terminal between the first parameter and the second parameter represents a distance between the mobile device and the payment terminal, the distance being compared with a predetermined reference distance range stored as data in a memory of the mobile device or in a memory of the payment terminal (PT) respectively.

4. The method according to claim 1, wherein the first parameter and the second parameter represent a time stamp that is based on the current date and time indicated by the mobile device and the payment terminal at start of a payment transaction.

5. The method according to claim 4, wherein the mobile difference value between the first parameter and the second parameter represents a transaction processing time of the mobile device and in that the terminal difference value between the first parameter and the second parameter represents a transaction processing time of the payment terminal, wherein the transaction processing time of the mobile device is compared with a predetermined reference time period range stored as data in a memory of the mobile device and wherein the transaction processing time of the payment terminal is compared with a predetermined reference time period range stored as data in a memory of the payment terminal.

6. The method according to claim 1, wherein the first parameter represents an identifier of the payment terminal based on a data including a code acquired, at a start of a payment transaction, by a camera associated with the mobile device the second parameter representing an identifier stored as data in a memory of the payment terminal.

7. The method according to claim 6, wherein a difference value between the first parameter and the second parameter represents a result of the acquired identifier and the identifier of the payment terminal received by the mobile device via the second token.

8. The method according to claim 1, wherein the reversible mathematical operation is one of an addition, multiplication, exclusive OR, or any other reversible combination thereof.

9. The method according to claim 1, further comprising receiving by the payment terminal from the mobile device the initial token after determining the initial token from the second token and the third token, and checking identity of the determined initial token by comparison with the received initial token before transmitting said initial token to the server of the payment authority.

10. The method according to claim 1, wherein tokens transmitted via the short-range wireless communication channel are digitally signed with a cryptographic key K negotiated using the data communication protocol between the mobile device and the payment terminal at the start of a payment transaction, the signature comprising a digest of the transmitted token encrypted with the cryptographic key, the digest being calculated by applying a one-way and collision free hash function of type SHA-2, SHA-3, BLAKE or of any other proprietary type on concerned token.

* * * * *